US012597108B2

(12) United States Patent
Paiva et al.

(10) Patent No.: US 12,597,108 B2
(45) Date of Patent: Apr. 7, 2026

(54) METHOD AND APPARATUS TO PERFORM A WIRELINE CABLE INSPECTION

(71) Applicant: Schlumberger Technology Corporation, Sugar Land, TX (US)

(72) Inventors: Pablo Paiva, Katy, TX (US); Pratyush Snehi, Pune (IN); Gabriel Arrigo Morosini, Bergen (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 294 days.

(21) Appl. No.: 18/453,818

(22) Filed: Aug. 22, 2023

(65) Prior Publication Data

US 2024/0070836 A1      Feb. 29, 2024

(30) Foreign Application Priority Data

Aug. 24, 2022      (IN) ............................. 202221048134

(51) Int. Cl.
 *G06T 7/00* (2017.01)
 *G01N 21/88* (2006.01)
(52) U.S. Cl.
 CPC ....... *G06T 7/0002* (2013.01); *G01N 21/8851* (2013.01); *G06T 2207/20081* (2013.01); *G06T 2207/20084* (2013.01)
(58) Field of Classification Search
 CPC ......... G06T 7/0002; G06T 2207/20081; G06T 2207/20084; G01N 21/8851

USPC .......................................................... 382/156
See application file for complete search history.

(56) References Cited

U.S. PATENT DOCUMENTS

| | | | | |
|---|---|---|---|---|
| 2015/0186772 | A1* | 7/2015 | Ohno | G06N 3/08 706/21 |
| 2018/0141787 | A1* | 5/2018 | Rudy | B66C 15/06 |

OTHER PUBLICATIONS

Zhou, Ping, et al. "Automatic detection of industrial wire rope surface damage using deep learning-based visual perception technology." IEEE Transactions on Instrumentation and Measurement 70 (2020): 1-11. (Year: 2020).*
Vallan, Alberto, and Filippo Molinari. "A vision-based technique for lay length measurement of metallic wire ropes." IEEE Transactions on Instrumentation and Measurement 58.5 (2009): 1756-1762. (Year: 2009).*
Huang, Xinyuan, et al. "Surface damage detection for steel wire ropes using deep learning and computer vision techniques." Measurement 161 (2020): 107843. (Year: 2020).*
Zhang, Xujie, et al. "A 3D reconstruction pipeline of urban drainage pipes based on multiview image matching using low-cost panoramic video cameras." Water 11.10 (2019): 2101. (Year: 2019).*

* cited by examiner

*Primary Examiner* — Jonathan S Lee
(74) *Attorney, Agent, or Firm* — Jeffrey D. Frantz

(57) ABSTRACT

Aspects of the disclosure provide for a method and apparatus to quickly identify defects in a cable used in hydrocarbon recovery wireline operations. A series of high-speed cameras take pictures along a length of the wireline cable, while artificial intelligence data processing algorithms process the camera data.

15 Claims, 6 Drawing Sheets

100

600

METHOD AND APPARATUS TO PERFORM A WIRELINE CABLE INSPECTION

CROSS-REFERENCE TO RELATED APPLICATIONS

The current application claims priority to Indian Provisional Patent Application 202221048134, filed Aug. 24, 2022, the entirety of which is incorporated by reference.

FIELD OF THE DISCLOSURE

Aspects of the disclosure relate to wireline cable systems used in hydrocarbon recovery operations. More specifically, aspects of the disclosure relate to methods and apparatus to perform efficient wireline cable inspection to reduce risk in hydrocarbon recovery operations.

BACKGROUND

Wireline cables are used to convey different downhole tools into the well, based on their mechanical strength and their electrical capabilities, to communicate downhole tool and surface acquisition systems. Therefore, wireline cables are used in any wireline operation worldwide, constituting a key component of the system.

The mechanical capabilities of the cable, depend on the architecture and its individual armors strength. In case of a fault, it could lead to a catastrophic incident resulting in injury to personnel and/or assets damage or loss or even complete loss of the well. The most common failure mode for wireline cable is localized corrosion, that could result in localized pitting damage or rust formation, degrading the ductility and strength of armors.

Conventional, preventative, maintenance procedure safeguards cable integrity, intended to detect existing anomalies and prevent future corrosion damage. However, it relies on technician ability to observe with a magnifying glass to detect different type of anomalies (erosion, stranded or crushed armors, corrosion pitting & rust formation among others). It requires spot checks at different cable lengths to assess overall quality, usually 2-5 meters, every 500 meters, that represents up to 1% of whole length. In specific cases, where cable was exposed to an aggressive mud system, the visual inspection is carried across the whole length of the cable exposed and process might require around 5-7 days.

The chances of success are limited on cables typically 5-10 km long, given cable spooling speed (10 kft/hr), small size of the anomalies (small as 2 mm×2 mm) and existing primitive tooling (magnifying glass).

There is a need to provide an apparatus and methods that are easier to operate than conventional apparatus and methods.

There is a further need to provide apparatus and methods that do not have the drawbacks discussed above, namely long and often unproductive field inspections that can take days to finish.

There is a still further need to reduce economic costs associated with operations and apparatus used in wireline analysis described above with conventional tools.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are; therefore, not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for performing a wireline cable inspection, is disclosed. The method may comprise obtaining a wireline cable and progressing the wireline through a visual camera apparatus configured to take photographic data of the wireline. The method may further comprise storing the photographic data of the wireline and using a machine learning model trained in advanced object detection through neural network processing techniques on the photographic data. The method may also comprise producing a defect report when the comparing the photographic data to the set of defects indicates a similarity between the photographic data to the set of defects.

In another example embodiment, a method for performing a cable inspection is disclosed. The method may comprise passing the cable through a visual camera apparatus configured to obtain data of the cable and storing the data of the cable on one of a memory arrangement and a computing arrangement. The method may further comprise comparing the data to a set of defects. The method may also comprise producing a defect report, when the data is detected as faulty by the model, after analyzing the set of defects.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are therefore not be considered limiting of its scope, for the disclosure may admit to other equally effective embodiments.

Figure 1:
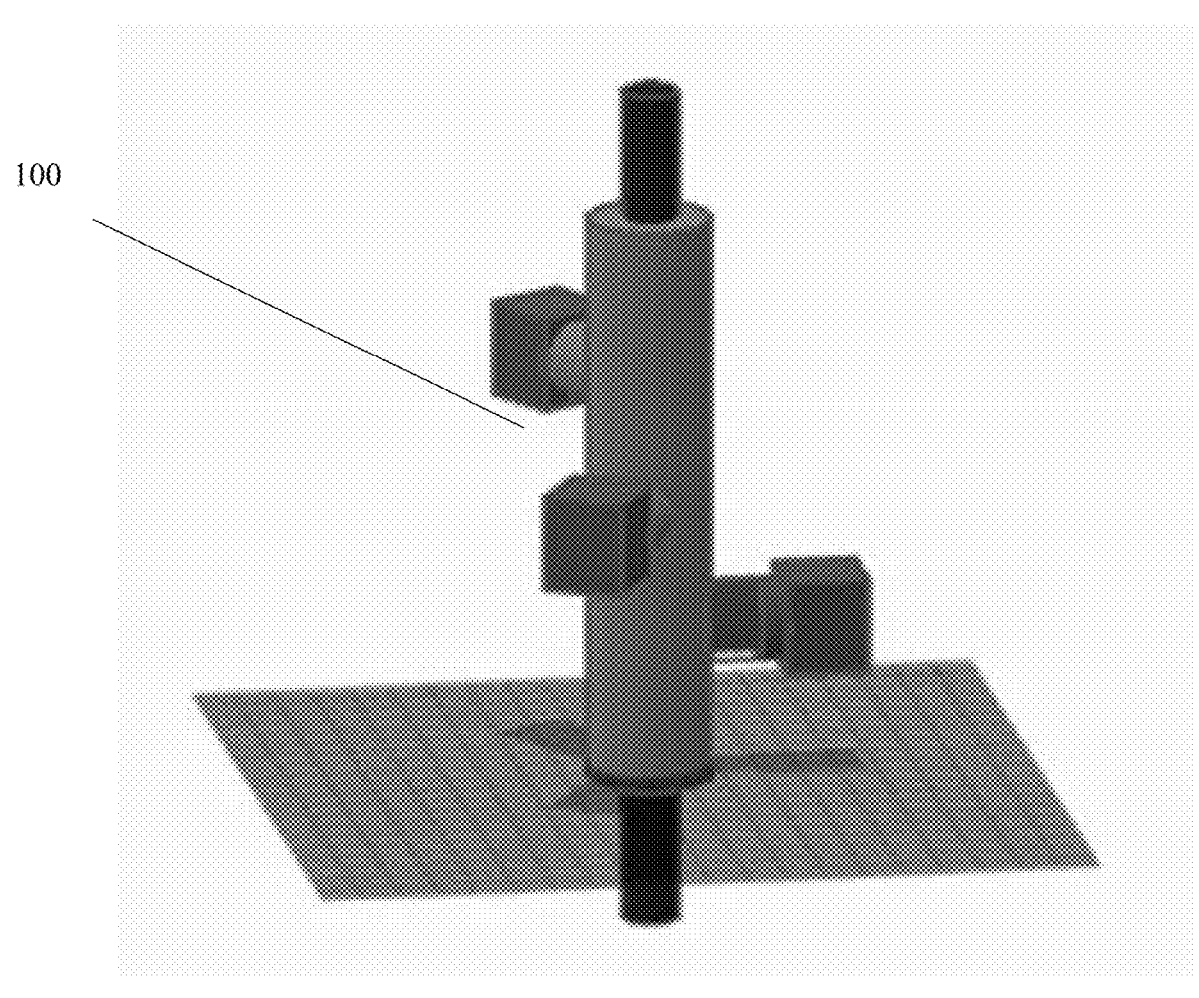
FIG. 1 is a side view of a camera array in one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure focus on cable maintenance procedure and wireline cable failure prevention. Aspects acquire images during high-speed cable spooling and apply advanced machine learning object detection through image processing techniques to detect existing anomalies and warn maintenance technician for further analysis, increasing considerably the chances of fault detection and reducing the time required to perform visual inspections.

Aspects of the disclosure also provide a compact device designed to capture high speed images with 3 industrial cameras to cover fully all cable surface for all types of wireline cables. The main characteristics of device acquisition are:

Cable Spooling Speed: >12 k ft/hr
Radial Coverage: 100-120% of cable surface (overlaps)
Cable length coverage: 100%
Circle of confusion: 7 micrometers
Sampling Rate: 70 images per second
Resolution: 1-2 cm (depending on spooling speed)

Aspects of the disclosure also use Artificial Intelligence (AI) components, using advanced imaging processing algorithms, it evaluates the images captured to automate the faults detection. The following steps are automated via AI:
Raw data ingestion
Images analysis using a trained model dataset (advanced image processing to perform automatic fault detection)
Warning system to highlight findings to maintenance technician
Maintenance report creation for documentation The overall accuracy performance of the system is above 95% for all test datasets used.

Referring to FIG. 1, a three array camera system 100 is used. The three array camera system 100 allows for the continual recording of images during a specific draw rate of cable through the system 100. The camera system 100 is connected to a computer arrangement that records the visual data obtained from the system 100. The visual data may then be processed by the computer arrangement to check for defects.

As will be understood, more or less numbers of visual images may be taken per length of cable drawn through the system 100; therefore, for example, a brand new cable may require fewer pictures per length than an older cable that has been used for many years. Thus, the time savings in inspection can be specifically pronounced in observations for older cables as those units require longer and more extensive review.

Although shown as three cameras, other configurations may also be used. For example, in one non-limiting embodiment, a six camera configuration may be used. The six camera configuration can provide two sets of three cameras and visual checking between a first set of cameras and a second set of cameras may occur, thus providing a redundancy, if required.

Figure 2:
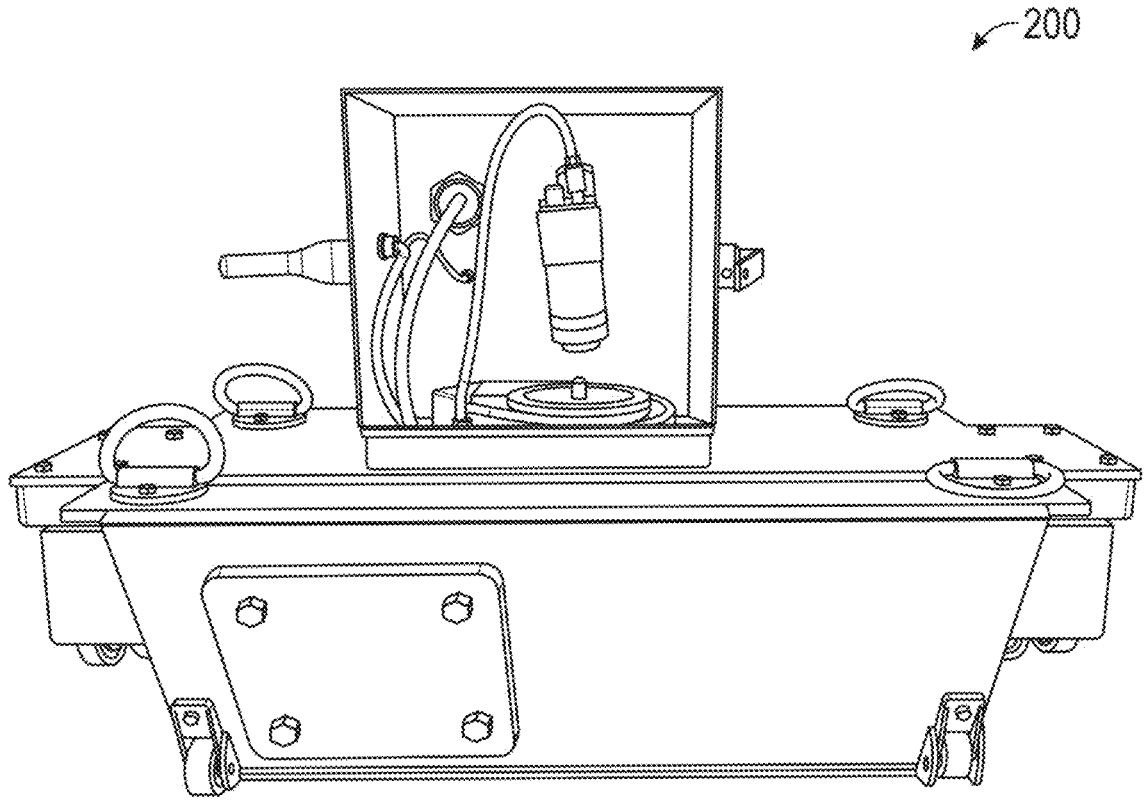
FIG. 2 is a side view of an arrangement to perform inspection of a wireline in one example embodiment of the disclosure.

Referring to FIG. 2, an example model of one apparatus 200 is illustrated. The apparatus 200 may be an enclosed unit where guides are used to run the wireline through the apparatus. In one embodiment, outside drivers are used to progress lengths of wireline through the apparatus 200. In another embodiment, drivers may be located on the inside or attached to the apparatus 200. The drivers may be programmed to progress a specific length of wireline cable through the apparatus 200 for a specific time. Thus, a specific number of visual pictures may be taken, as specified by operators over the wireline.

As will be understood, the speed of the wireline passing through the apparatus may be changed over the entire length of the wireline as the wireline progresses through the apparatus 200. For example, wireline at the top levels of the cable spool would be at the bottom of the well and would therefore be supporting less weight compared to levels of wireline that are on the inside of the spool. To this end, as the weight is increased on the inside levels of cable, it may be more advantageous to record a larger number of pictures per unit length for more stressed sections of the wireline. Thus, operators may vary evaluations after a specific number of linear feet have been processed. The apparatus 200 may have indicators or be connected to a computer to allow operators the ability to see the number of pictures taken and the approximate number of feet processed.

As the apparatus 200 keeps track of the progress on a linear length basis, at the time of processing, defects found by the apparatus 200 may be easily identified to operators, by allowing the apparatus 200 to index the wireline a second time through the apparatus 200 until an area of concern is uncovered on the spool for further visual inspection by professionals, if needed.

The identification of different types of anomalies is also provided in some aspects of the disclosure. For example, over 5000 different types of anomalies may be loaded into visual data banks and the visual records recorded of the wireline may be compared to these anomalies. To help resolve issues, armor cladding issues of specific corrosion types may be observed and provided to operators as part of an analysis package for review. The defects encountered may then be summarized and provided to operators to allow the operators the best information upon which to potentially use the wireline in other projects.

As a non-limiting embodiment, the apparatus 200 may identify specific corrosion degradation in a wireline. It is further known that if this specific wireline were again exposed to a known type of corrosive environment, that the wireline could be unfit for service. That specific wireline may then be designated for use in environments that preclude a specific type of corrosion, thereby enhancing the usable life of the wireline and thereby cutting down overall costs of operation.

By evaluating many more visual images in an automated manner than manual visual inspection, more accurate and detailed analysis of wireline may be achieved. Such evaluations may also enable the wireline to be analyzed on a more consistent basis. Some operations personnel, for example, may not be as familiar with a specific type of defect in a wireline that is prevalent in certain wells in a specific geographic area. Instead of missing all of the potential defects, the apparatus 200 may identify the potentially unaware operators to the defects that may be universally accepted as satisfactory. Moreover, if different types of defects are discovered, then the new types of defects may be added to the apparatus, thus allowing consistent identification, regardless of the skill set of the operator.

Figure 3:
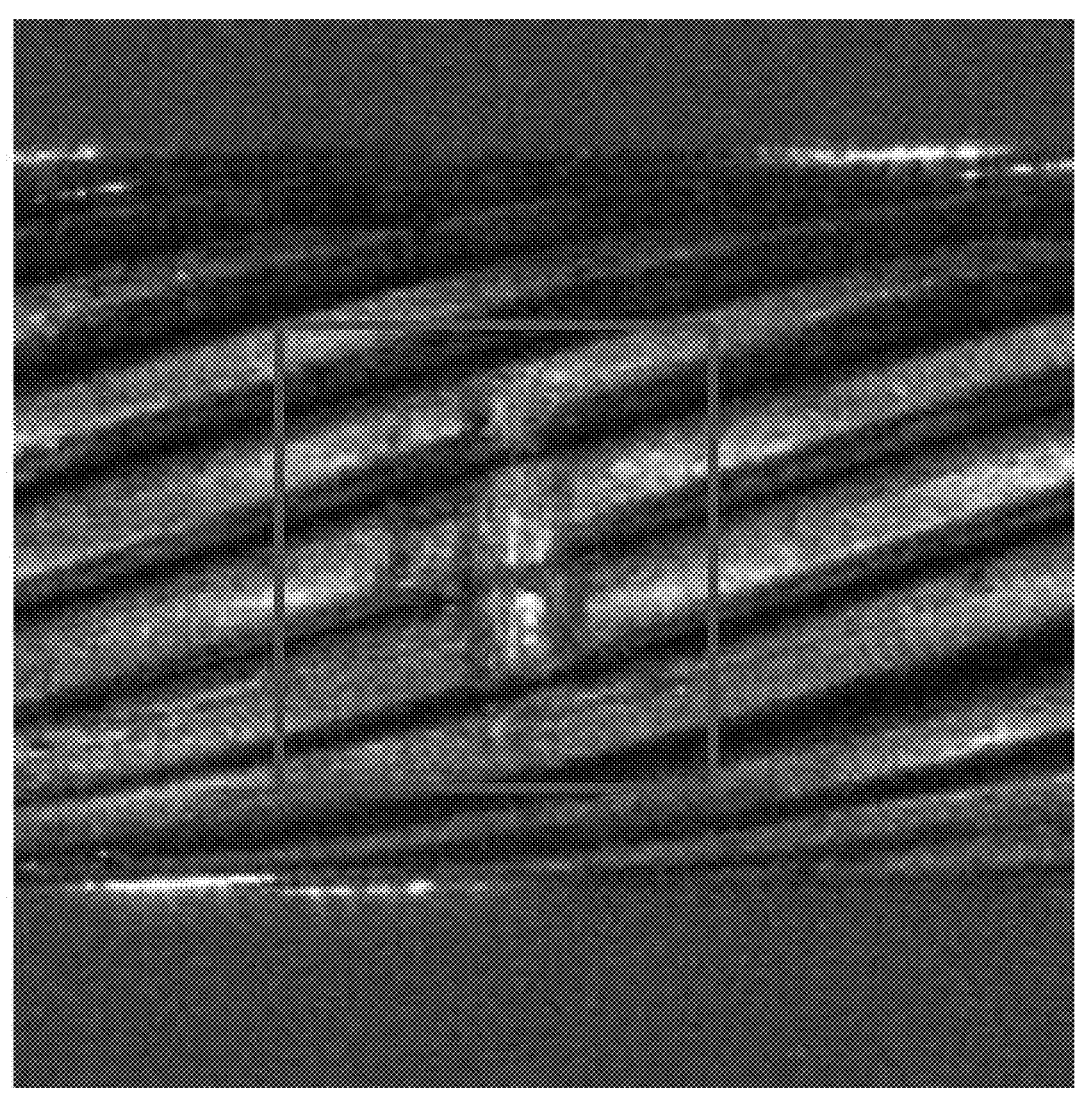
FIG. 3 is a side view of a defect identified by the arrangement of FIG. 2.
Figure 4:
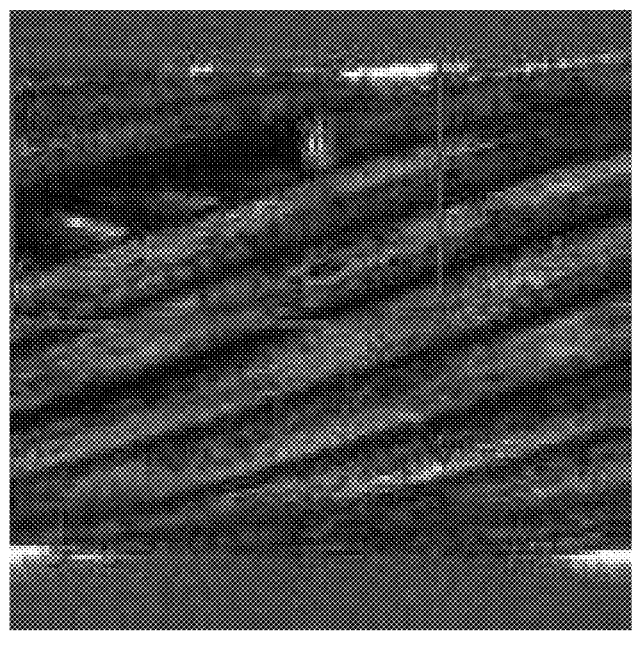
FIG. 4 is a side view of a defect identified by the arrangement of FIG. 2.
Figure 5:
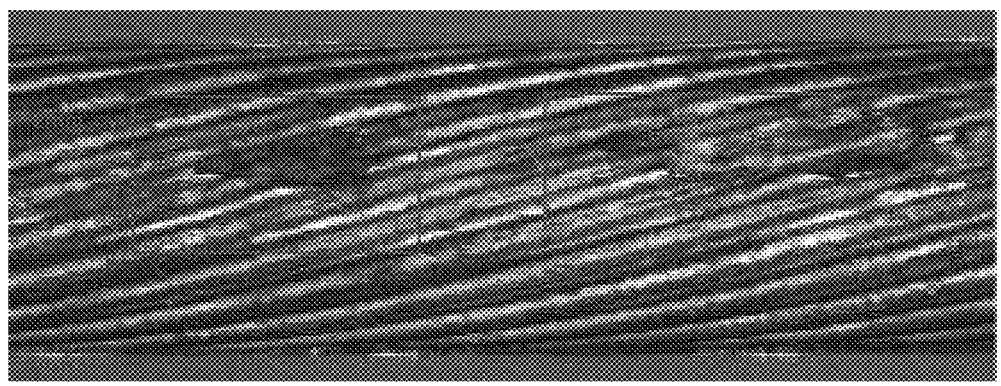
FIG. 5 is a side view of a defect identified by the arrangement of FIG. 2.

Referring to FIGS. 3, 4 and 5, different types of defects identified by the apparatus 200 are depicted.

Figure 6:
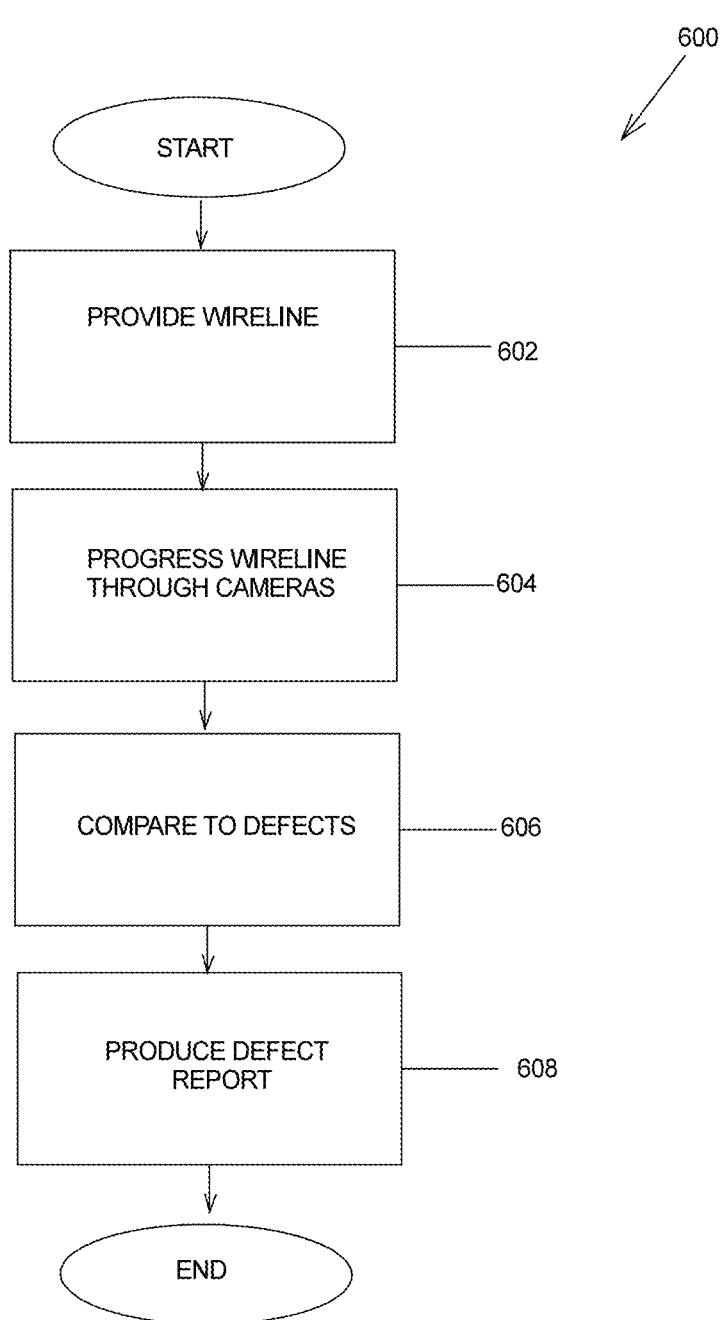
FIG. 6 is a method of one example embodiment of the disclosure.

Referring to FIG. 6, a method for performing a wireline cable inspection is illustrated. The method 600, entails providing a wireline at 602. At 604, the method continues by progressing the wireline through a visual camera apparatus configured to take photographic data of the wireline. As will be understood, the amount of progression of the wireline may be selected by operators as well as the number of photographs (or video) taken during the progression of the wireline through the apparatus. At 606, the method progresses on comparing the photographic data to a set of defects. At 608, the method progresses to producing a defect report when photographic data is detected as faulty by the model after analyzing the set of defects. The defect report can include, producing a linear footage of where the defect is, the position of the defect and the type of defect. The comparing of the photographic data may use artificial intelligence to determine the presence of a defect. In other embodiments, the data may be stored for a period of time. After the passage of a period of time, a second set of visual data may be obtained by the apparatus. This second set of data may be processed to see the defects generated over the amount of time that transpired between the first analysis and the second analysis.

Aspects of the disclosure may be performed as a method. During such method steps, aspects of the disclosure can be programmed to operate on a machine, such as a personal computer, computing arrangement, computer server or other such programmable configuration. In embodiments that require decision making, decisions may be made through artificial intelligence.

In embodiments requiring artificial intelligence, different configurations may be used to perform the method steps. This may include the use of a neural network to enable decision making. The neural network may include an input level, a hidden level and an output level. In embodiments, a single hidden level is provided. In other embodiments, more than a single hidden level is provided. Each of the hidden levels may provide for decision making capabilities to achieve desired outcomes to the output level. Mathematical algorithms may be used in each of the hidden levels to achieve the desired outcomes. If the desired outcomes are not produced, then the hidden levels may be altered to achieve better outcomes.

In embodiments where there are greater than a single hidden level, such configurations may be defined as capable of deep learning. Such multiple layer detection making capabilities are especially adapted for making multiple complex decisions. In some embodiments, a single pass may be processed through the neural network. In other embodiments, multiple passes may be processed through the neural network. In such multiple passes, a recurrent neural network is established to fine tune the results and provide optimal results.

Results may be checked through the use of an error function. The type of error function may be chosen according to the type of data being checked. In some embodiments, a mean squared error may be used. In some embodiments, a backpropagation or backpropagation by errors may be done to update the nodes within the artificial intelligence network.

Aspects of the disclosure provide for apparatus and methods that are easier to operate than conventional apparatus and methods.

Aspects of the disclosure provide for apparatus and methods that do not have the drawbacks discussed above, namely long and often unproductive field inspections that can take days to finish.

Aspects of the disclosure provide for reduced economic costs associated with operations and apparatus used in wireline analysis described above with conventional tools.

In one example embodiment, a method for performing a wireline cable inspection is disclosed. The method may comprise obtaining a wireline cable and progressing the wireline through a visual camera apparatus configured to take photographic data of the wireline. The method may further comprise storing the photographic data of the wireline and using a machine learning model trained in advanced object detection through neural network processing techniques on the photographic data. The method may also comprise producing a defect report when the comparing the photographic data to the set of defects indicates a similarity between the photographic data to the set of defects.

In one example embodiment, the method may be performed wherein a speed of the progressing the wireline through the visual apparatus is chosen by an operator.

In one example embodiment, the method may be performed wherein the visual camera apparatus has three cameras.

In one example embodiment, the method may be performed wherein the operator chooses both a speed of progressing the wireline through the visual apparatus and a number of photographs per length of wireline.

In one example embodiment, the method may be performed wherein the set of defects is a visual set of defects.

In one example embodiment, the method may be performed wherein the comparing the photographic data is performed through artificial intelligence.

In one example embodiment, the method may be performed wherein the defect report indicates a linear position of a defect on the wireline.

In one example embodiment, the method may be performed wherein the defect report further indicates a type of defect on the wireline.

In another example embodiment, the method may further comprise running the wireline again through the apparatus after a period of time has elapsed and identifying defects in the wireline that have occurred since the first data was obtained.

In another example embodiment, the method may further comprise generating a second defect report with the identified defects in the wireline that have occurred since the first data was obtained.

In another example embodiment, a method for performing a cable inspection is disclosed. The method may comprise passing the cable through a visual camera apparatus configured to obtain data of the cable and storing the data of the cable on one of a memory arrangement and a computing arrangement. The method may further comprise comparing the data to a set of defects. The method may also comprise producing a defect report when the data is detected as faulty by the model after analyzing the set of defects.

In one example embodiment, the method may be performed wherein a speed of the progressing the cable through the apparatus is chosen by an operator.

In one example embodiment, the method may be performed wherein the apparatus has at least three cameras.

In one example embodiment, the method may be performed wherein the operator chooses both a speed of progressing the cable through the apparatus and a number of photographs per length of cable.

In one example embodiment, the method may be performed wherein the set of defects is a visual set of defects.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for performing a wireline cable inspection, comprising:

obtaining a wireline cable;

progressing the wireline cable through a visual camera apparatus configured to take photographic data of the wireline cable at fixed spatial intervals along a length of the wireline cable as the wireline cable is progressed through the visual camera apparatus, such that the photographic data corresponds to specific locations along the wireline cable, wherein the photographic data is taken at shorter fixed spatial intervals at specific locations along the wireline cable identified as being more stressed;

storing the photographic data of the wireline cable;

comparing the photographic data to a set of defects using a machine learning model trained in advanced object detection through neural network processing techniques on the photographic data; and producing a defect report in response to a similarity indicated between the photographic data and the set of defects.

2. The method according to claim 1, wherein a speed of the progressing the wireline cable through the visual camera apparatus is chosen by an operator.

3. The method according to claim 1, wherein the visual camera apparatus has three cameras.

4. The method according to claim 1, wherein an operator chooses both a speed of progressing the wireline cable through the visual camera apparatus and a number of the fixed spatial intervals along the length of the wireline cable.

5. The method according to claim 1, wherein the set of defects is a visual set of defects.

6. The method according to claim 5, wherein the comparing the photographic data is performed through artificial intelligence.

7. The method according to claim 1, wherein the defect report indicates a linear position of a defect on the wireline cable.

8. The method according to claim 7, wherein the defect report further indicates a type of defect on the wireline cable.

9. The method according to claim 1, further comprising:

progressing the wireline cable again through the visual camera apparatus after a period of time has elapsed; and identifying defects in the wireline cable that have occurred after the period of time has lapsed.

10. The method according to claim 9, further comprising producing a second defect report with the identified defects in the wireline cable that have occurred after the period of time has lapsed.

11. A method for performing a cable inspection, comprising:

identifying specific locations of a cable indicative of the cable being stressed;

passing the cable through a visual camera apparatus configured to obtain data of the cable at fixed spatial intervals along a length of the cable during motion, such that the data corresponds to specific locations along the cable, wherein the data is obtained at shorter fixed spatial intervals at the specific locations along the cable identified as being stressed;

storing the data of the cable on one of a memory arrangement and a computing arrangement;

comparing the data to a set of defects; and producing a defect report in response to the data being detected as faulty by a model after analyzing the set of defects.

12. The method according to claim 11, wherein a speed of the passing the cable through the visual camera apparatus is chosen by an operator.

13. The method according to claim 11, wherein the visual camera apparatus has three cameras.

14. The method according to claim 11, wherein an operator chooses both a speed of passing the cable through the visual camera apparatus and the fixed spatial intervals to obtain data along the length of the cable.

15. The method according to claim 11, wherein the set of defects is a visual set of defects.

\* \* \* \* \*